(12) United States Patent
Ward et al.

(10) Patent No.: US 8,591,359 B2
(45) Date of Patent: Nov. 26, 2013

(54) TENSIONER ASSEMBLY WITH SEALED PULLEY

(75) Inventors: Christopher B Ward, Marietta, PA (US); Thomas E Hughes, Wilmington, NC (US); Matthew B Neal, Wilmington, NC (US)

(73) Assignee: Fenner U.S., Inc., Manheim, PA (US)

( * ) Notice: Subject to any disclaimer, the term of this patent is extended or adjusted under 35 U.S.C. 154(b) by 943 days.

(21) Appl. No.: 12/125,398

(22) Filed: May 22, 2008

(65) Prior Publication Data

US 2009/0291791 A1 Nov. 26, 2009

(51) Int. Cl.
*F16H 7/12* (2006.01)

(52) U.S. Cl.
USPC ........................................ 474/135

(58) Field of Classification Search
USPC ............... 474/135, 199, 89, 94; 384/448, 384/482–486, 489, 546; 277/267, 353, 549, 277/637; 464/131
See application file for complete search history.

(56) References Cited

U.S. PATENT DOCUMENTS

| | | | | |
|---|---|---|---|---|
| 4,025,132 A | * | 5/1977 | Watanabe | 384/130 |
| 4,557,709 A | * | 12/1985 | St. John | 474/117 |
| 5,964,674 A | | 10/1999 | Serkh et al. | |
| 6,854,893 B2 | * | 2/2005 | Schmidt | 384/486 |
| 6,855,079 B2 | * | 2/2005 | Cura et al. | 474/135 |
| 7,011,593 B2 | * | 3/2006 | Schenk et al. | 474/199 |
| 2005/0026729 A1 | * | 2/2005 | Schenk et al. | 474/101 |
| 2006/0188191 A1 | * | 8/2006 | Schenk et al. | 384/489 |

FOREIGN PATENT DOCUMENTS

JP 2006-162035 6/2006

OTHER PUBLICATIONS

International Search Report issued Dec. 21, 2009.
Fenner Drives"T-Max Belt & Chain Tensioners" Brochure, published 2003.
U.S. Appl. No. 11/560,608, filed Nov. 16, 2006, entitled: Rotary Tenionser.
U.S. Appl. No. 10/632,703, filed Aug. 1, 2003, entitled: Bi-Directional Belt Tensioner.
U.S. Appl. No. 10/941,445, filed Sep. 15, 2004, entitled: Bi-Directional Belt Tensioner.

* cited by examiner

*Primary Examiner* — William A Rivera
(74) *Attorney, Agent, or Firm* — Stephen H. Eland; Dann, Dorfman, Herrell & Skillman

(57) ABSTRACT

A pulley assembly operable in connection with a tensioner assembly is provided for tensioning a belt. The pulley assembly includes one or more elements for sealing the pulley to protect the pulley assembly in harsh environments. For instance, the pulley assembly may include one or more shields for protecting the pulley from contaminants entering the interior of the pulley assembly that can lead to premature failure.

11 Claims, 4 Drawing Sheets

TENSIONER ASSEMBLY WITH SEALED PULLEY

FIELD OF THE INVENTION

The present invention relates to the field of devices for tensioning belts. In particular the present invention relates to an improved belt tensioner adapted for use in harsh environments. More specifically, the present invention provides a belt tensioner having a pulley with features that protect against contamination and wear in harsh operating environments.

BACKGROUND

Belts are used in a variety of applications to transmit power. During use, the belt may tend to elongate due to the tensile forces on the belt. The elongation slackens the belts, which leads to slippage, so that the belt does not transmit the power as efficiently.

To reduce the detrimental effects of belt elongation, tensioners are commonly used to reduce the slack so that a belt continues to efficiently transfer power even as the belt elongates. Specifically, a pulley attached to a tensioner engages the belt. The tensioner biases the pulley into engagement with the belt to reduce the slack. Although tensioners are effective in eliminating the slack, the known tensioners may face premature failure when operating in harsh environments.

SUMMARY OF THE INVENTION

In order to overcome the problems associated with premature failure of tensioner assemblies operating in harsh environments, the present invention provides a tensioner assembly adapted to reduce the effects of the environment. Specifically, a pulley assembly is provided, which is operable in connection with a tensioner operable to tension a belt. The tensioner includes an arm and a biasing element for biasing the arm.

The pulley is configured to engage a belt, and has a bore that has an inner opening and an outer opening. The pulley also includes a bearing connected with the bore of the pulley. An outer shield encloses the outer opening of the pulley bore to seal the outer opening to impede migration of contaminants through the outer opening. Optionally, the pulley also includes an inner shield for impeding migration of contaminants through the inner opening of the pulley bore. Further, the inner shield optionally includes a flange extending radially outwardly to overlap the inner opening of the bore.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Referring now to the figures in general, a tensioner assembly with sealed pulley is designated generally 10. The assembly 10 includes a tensioner 20 and a pulley assembly 30 mounted on the tensioner. The tensioner 20 is operable to bias the pulley assembly 30 toward a belt to tension the belt.

Figure 1:
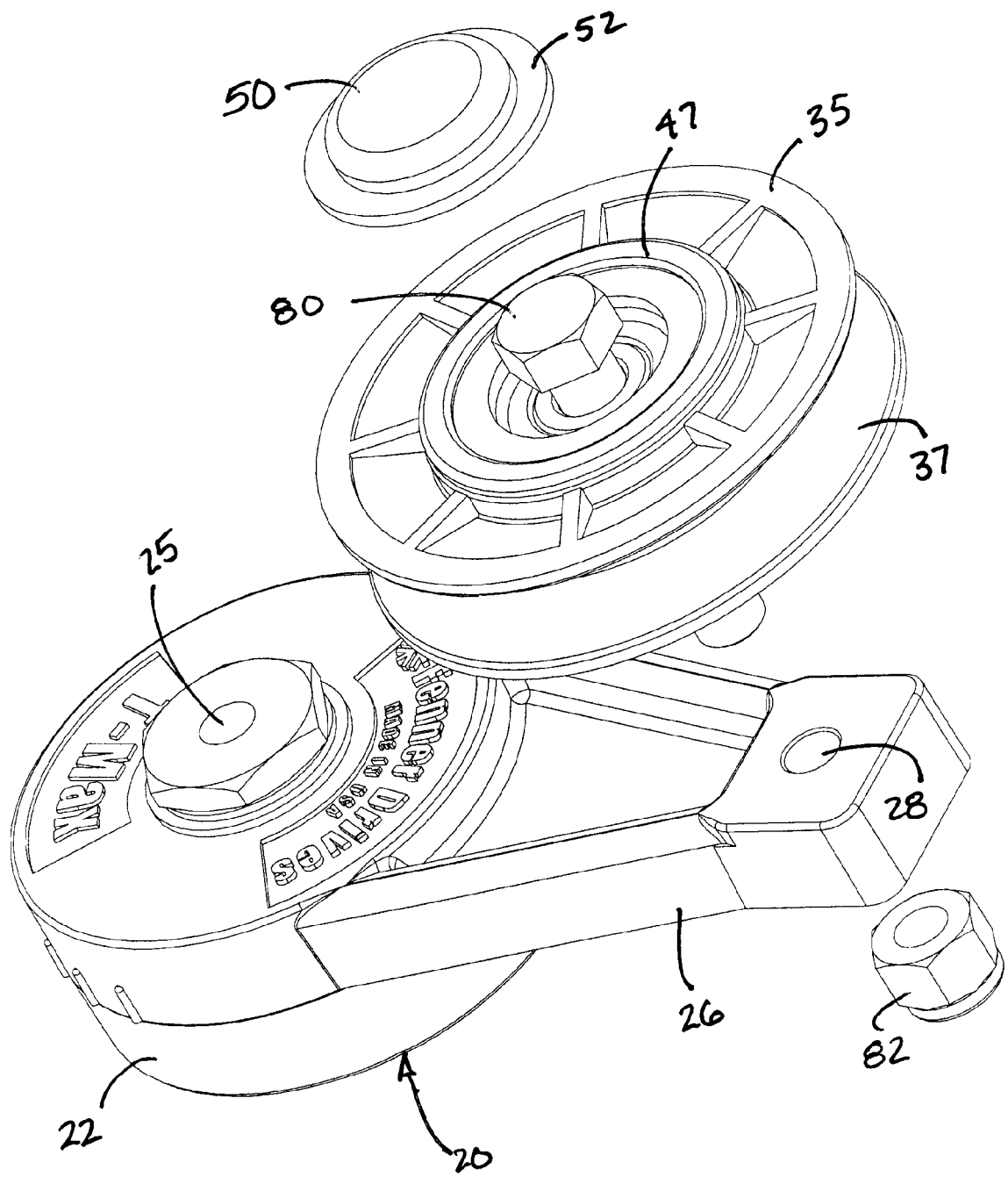
FIG. 1 is a partially exploded perspective view of a tensioner assembly with a sealed pulley.
Figure 4:
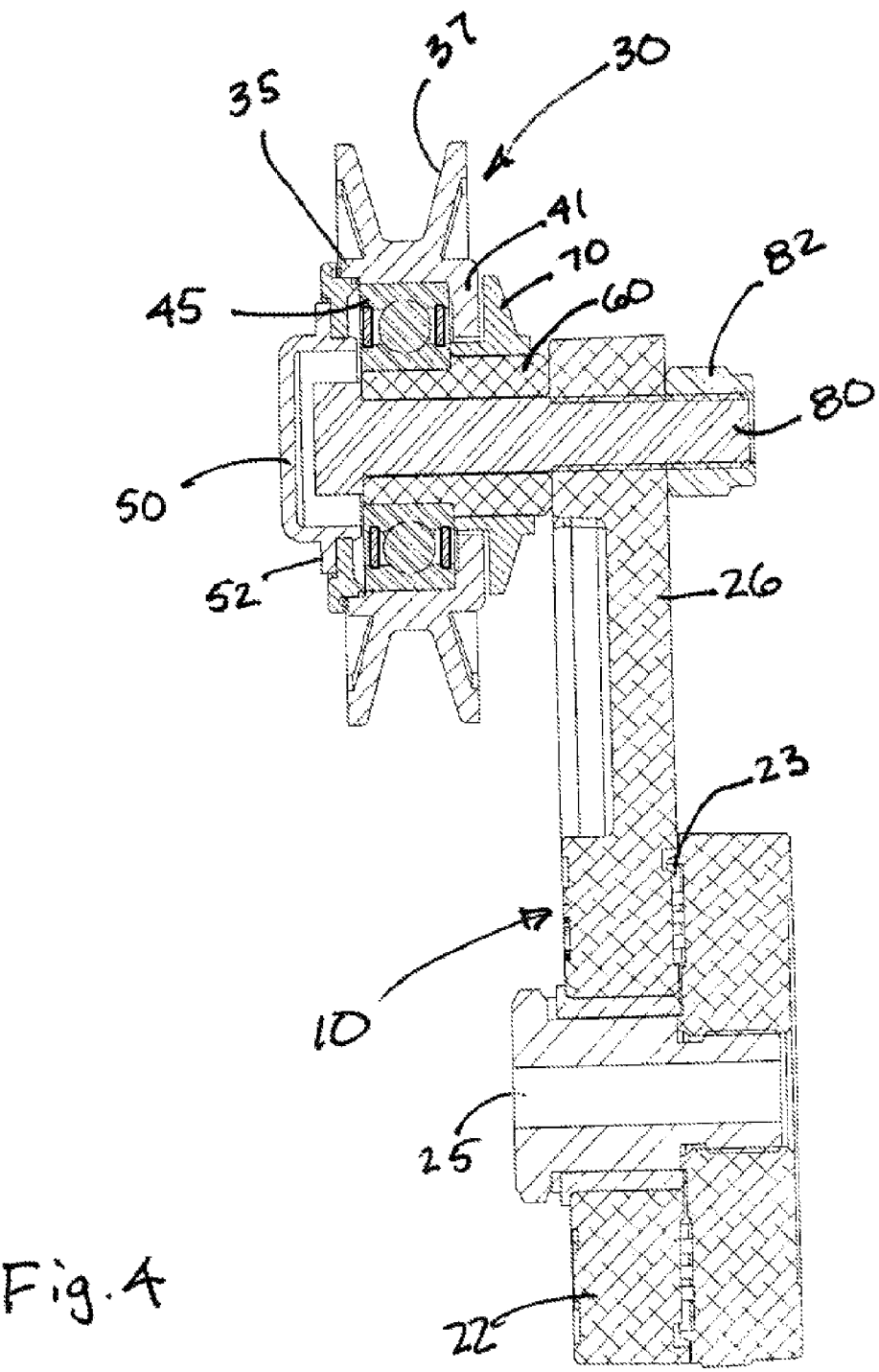
FIG. 4 is a sectional view of the tensioner assembly with sealed pulley illustrated in FIG. 1.

Referring to FIGS. 1 and 4, the tensioner 20 is illustrated as a rotary tensioner. The tensioner 20 includes a housing 22 for housing a biasing element 23, such as a spring. An arm 26 attached to the housing 22 projects away from the housing. In the present instance, the arm is integrally formed with the housing. However, the arm may be releasably connectable with the housing in other applications.

The biasing element 23 in the housing provides a biasing force to bias the arm 26. Since the tensioner 20 is a rotary tensioner, the biasing force tends to rotate the arm 26. The details of a rotary tensioner that are operable in the tensioner assembly 10 is provided in U.S. patent application Ser. No. 11/560,608, filed Nov. 16, 2006. The details of patent application Ser. No. 11/560,608 are incorporated herein be reference. Alternatively, the tensioner 20 may be a linear tensioner, in which the biasing element (s) provide a radial force directed radially outwardly from the housing.

As shown in FIG. 1, the tensioner 20 has a central axis 25 and the arm 26 rotates about the central axis. Spaced apart from the central axis 25 adjacent a distal end of the arm 26 is a mounting hole 28 for mounting the pulley assembly to the arm. In the present instance, the mounting hole is a through hole that is not threaded. However, the mounting hole 28 may be threaded and/or a blind hole as well.

As shown in FIG. 4, the pulley assembly 30 is attached to the distal end of the tensioner arm 26. A mounting bolt 80 extends through the pulley assembly 30 and through the mounting hole 28. In the present instance, a connector in the form of a nut 82 engages the bolt 80 to attach the pulley to the tensioner arm 26. Alternatively, as mentioned above, the mounting hole 28 may be a threaded hole, and the mounting bolt 80 may threadedly engage the mounting hole to connect the pulley assembly 30 to the tensioner arm 80.

Figure 2:
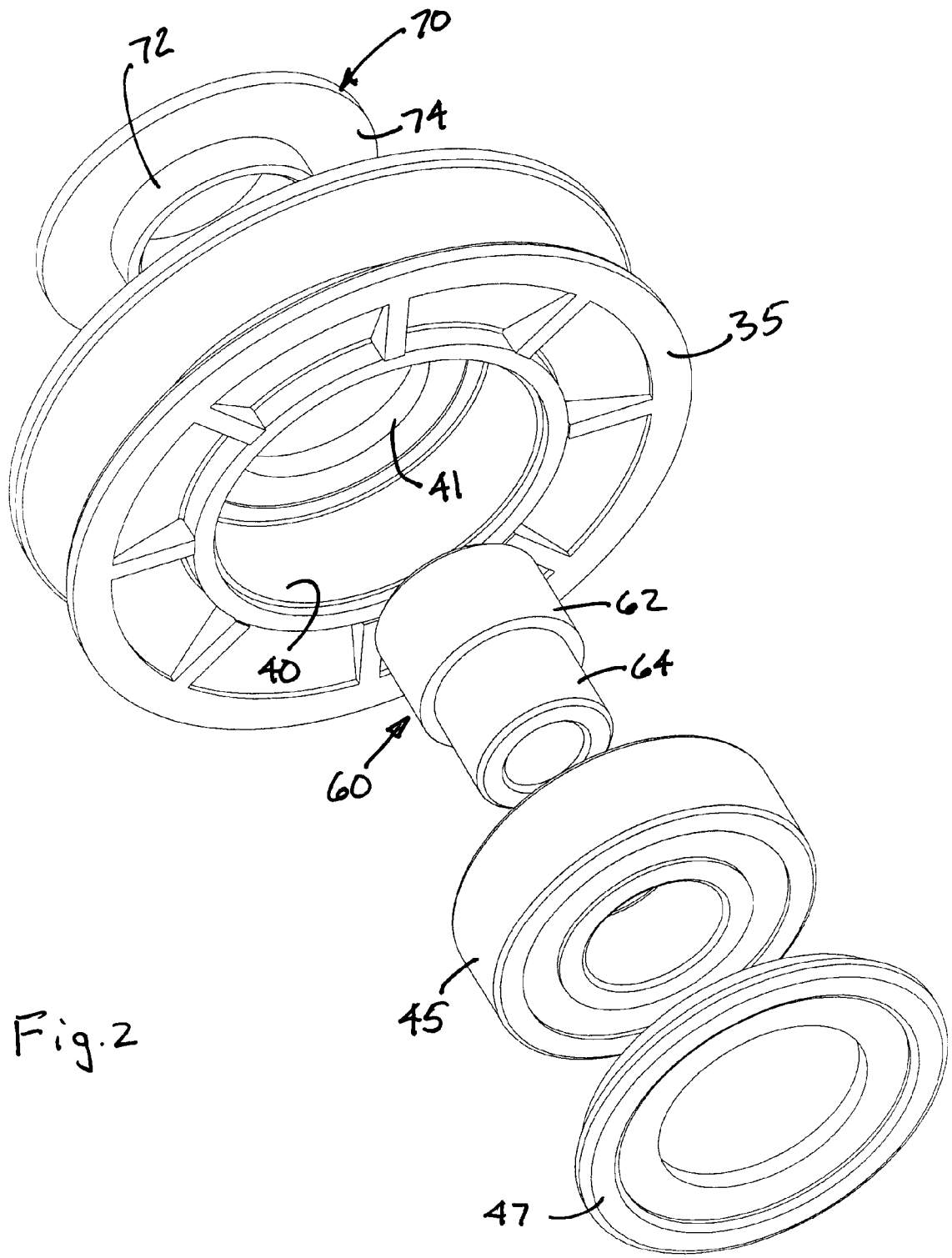
FIG. 2 is an exploded perspective view of the sealed pulley illustrated in FIG. 1.
Figure 3:
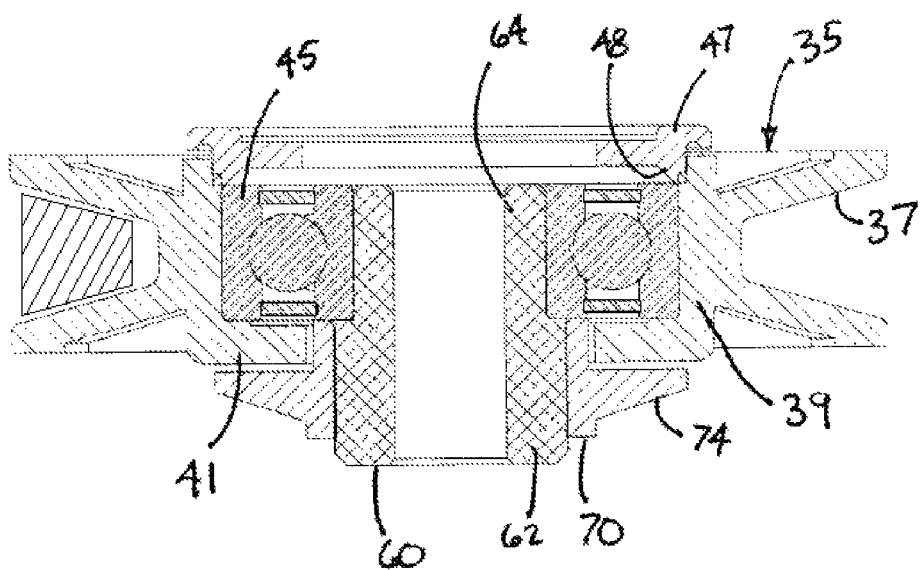
FIG. 3 is a sectional view of the sealed pulley illustrated in FIG. 2.

Referring now to FIGS. 2 and 3, the details of the pulley assembly 30 will be described in greater detail. The pulley assembly 30 includes a pulley 35 that is configured to engage a belt to be tensioned. The pulley 35 includes a central hub 39 and a pair of flanges projecting outwardly from the hub 39 to form a v-groove 37 for engaging the belt B to be tensioned.

The central hub 39 of the pulley 35 includes a cavity 40 that forms a central bore. The cavity 40 is configured to received sealed bearing 45. In the present instance, the bearings 45 are ball bearings. The cavity 40 is open at both the inner end and the outer end of the pulley 35. However, a flange 41 adjacent the inner end of the pulley projects radially inwardly to form a reduced diameter opening. As shown in FIG. 3, the bearing 45 abuts the flange 41, so that the flange retains the bearing within the cavity.

The outer end of the cavity has a diameter that is larger than the diameter of the bearing so that the bearing can be inserted into the cavity through the outer opening. Additionally, a notch or shoulder is formed adjacent the outer end of the cavity to cooperate with a retainer to retain the bearing in the pulley. Specifically, as shown in FIG. 3, a bearing retainer 47 partially covers the outer opening of the cavity 40 to retain the bearing. The retainer 47 includes a central opening for providing access to the bore of the pulley 35. Additionally, the retainer 47 includes a protrusion, such as an annular protrusion 48 that seats against the bearing 45 to retain the bearing in place.

Although the pulley 35 may be formed of a variety of materials, such as aluminum or other metal, in the present instance, the pulley is molded from reinforced nylon. The retainer 47 is also formed of reinforced nylon, and is fixedly attached to the pulley 35.

The pulley assembly also includes one or more sealing elements to seal the pulley to impede contaminants from entering the cavity. Specifically, the pulley assembly 30 includes one or more elements for sealing the inner and/or outer ends of the bore of the pulley 35. In the present instance, the pulley assembly includes an outer shield 50 and an inner shield 70.

The details of the outer shield 50 are most clearly seen with reference to FIGS. 1 and 4. The outer shield 50 is a cup-shaped element that provides a cap to enclose the outer opening of the pulley 35. Specifically, the outer shield 50 is a generally cylindrically-shaped cup with a circumferential flange 52 that extends radially outwardly from the outer surface of the cup. The inner edge of the cup fits within the opening of the retainer 47, and the flange 52 overlaps the retainer to enclose the opening. In the present instance, the outer shield 50 forms a snap fit connection with the retainer 47 so that the outer shield substantially seals the outer end of the pulley to impede contaminants from entering the pulley cavity 40. For instance, the outer shield may be formed of a reinforced nylon similar to the material used to form the pulley and/or retainer, and the inner edge of the shield may flare outwardly to form a circumferential rib that cooperates with the edge of the opening in the retainer 47 to form a snap fit.

The details of the inner shield 70 are most clearly seen with reference to FIGS. 2-4. The inner shield 70 is positioned to shield the inner opening of the pulley (i.e. the side of the pulley that confronts the arm 26 of the tensioner 20). The inner shield 70 includes a generally cylindrical body 72 and a circumferential flange 74 that projects radially outwardly from the body. In the present instance, the body 72 of the shield 70 projects into the inner opening of the pulley, so that the distal end of the body is adjacent to or abutting the bearing 45. The flange 74 may be configured in a variety of shapes, and in the present instance, is a tapered flange, having a generally flat surface opposing the inner face of the pulley and having an angled surface on the side opposing the tensioner arm 26.

The inner shield 70 is mounted on a mounting hub 60 that projects into the pulley. The inner hub 60 has a base 62 and a reduced diameter tip 64. The tip 64 projects into the bearing 45 and in the present instance, the tip projects into the bearing substantially the entire width of the bearing. The body 72 of the inner shield 70 is mounted onto the base 62 of the mounting hub 60.

In the present instance, the shield is rigidly connected to the pulley so that the spacing between the inner shield and the pulley is substantially fixed. More specifically, the inner shield 70 is rigidly fixed to the mounting hub 60, which is rigidly fixed to the bearing 45. In the present instance, the inner shield 70 is fixedly adhered to the mounting hub 60. Additionally, in the present instance, the mounting hub is formed of metal, such as aluminum, and is press fit into the bearing to form a substantially rigid interference fit.

As shown in FIG. 4, the pulley assembly 30 is connected to the tensioner arm 26 by a bolt 80. The bolt 80 extends through a bore in the mounting hub, and through the tensioner arm. The nut 82 on the backside of the tensioner arm threadedly engages the bolt to tighten the bolt against the mounting hub 60. In this way, the bolt tightens against the mounting hub so that the mounting hub and the attached inner shield 70 are fixed relative to the tensioner arm.

The details of construction of the tensioner assembly 20 are provided in U.S. application Ser. No. 11/560,608, and the details of construction for the pulley assembly 30 are now provided. Referring to FIGS. 2-4, the pulley assembly 30 is assembled by inserting the bearing 45 into the cavity 40 of the pulley 35. Preferably, the bearing 45 is sized to form a friction fit or interference fit with the cavity 40, so that the outer race of the bearing is fixed relative to the pulley 35. After the bearing is inserted into the cavity, the bearing retainer is connected to the pulley to partially enclose the outward end of the pulley. The bearing retainer 47 may be connected to the pulley in a variety of ways, such as by welding or adhesive. In the present instance, both the bearing retainer and the pulley 35 are formed from reinforced plastic, and are connected by welding the two together.

Next, the inner shield 70 is connected with the mounting hub 60. For instance, the inner shield 70 may be formed of a plastic, such as reinforced plastic, and it may be press fit onto the mounting hub to form an interference fit. Alternatively, the inner shield may be connected to the mounting hub 60 by an adhesive.

After the inner shield is attached to the mounting hub, the mounting hub is connected with the bearing 45. Specifically, in the present instance, the mounting hub 60 is formed of metal, such as aluminum, and the mounting hub is press fit into the bearing so that the mounting hub forms an interference fit with the inner race of the bearing.

The mounting hub 60 and inner shield 70 are formed so that they substantially enclose the inner end of the pulley. Specifically, the inner shield 70 is positioned on the mounting hub so that the gap between the face of the pulley and the opposing face of the inner shield is small enough to impede the migration of contaminants into the interior of the cavity, while providing sufficient clearance to allow the pulley to rotate relative to the inner shield without interference. To provide the appropriate gap, the gap between the inner shield and the face of the pulley is less than half the thickness of the inner shield, and in the present instance is less than ¼ the thickness of the inner shield. Similarly, the body 72 of the inner shield is configured to provide a gap between the inner shield and the bore of the pulley created by the inner flange 41. Again, the gap is configured to impede migration of contaminants into the interior of the pulley while providing sufficient clearance to allow the pulley to rotate relative to the body 72 of the inner shield. To provide the appropriate gap, the gap between the inner shield and the face of the pulley is less than half the thickness of the inner shield, and in the present instance is less than ¼ the thickness of the inner shield.

To attach the pulley assembly to the tensioner, the bolt 80 is inserted through the outer end of the pulley, through the mounting hub 60 and through the mounting hole 28 in the tensioner arm 26. The nut 82 is then tightened to tighten the bolt head down against the mounting hub 60. In this way, the mounting hub is fixedly connected to the tensioner arm.

After the pulley assembly 35 is connected to the tensioner arm 26, the outer shield 50 is connected to the pulley 35. Specifically, the outer shield 50 is snapped onto the bearing retainer 47 to form a releasable snap fit with the pulley 35. In this way, the outer shield 50 encloses the outer end of the pulley during use, but can be easily removed to remove the pulley assembly from the tensioner arm if desired. For instance, to remove the pulley assembly 30 from the tensioner, the outer shield 50 can be pried off the pulley to expose the mounting bolt 80. The pulley assembly can then be removed from the bolt by unthreading the nut from the bolt.

It will be recognized by those skilled in the art that changes or modifications may be made to the above-described embodiments without departing from the broad inventive concepts of the invention. For instance, in the embodiment above, the pulley assembly 30 includes a bearing retainer 47 connected to the pulley, and an outer shield 50 that connects with the bearing retainer. Alternatively, the bearing retainer could be molded together with the outer shield to create a single element for enclosing the outer end of the pulley 35. Similarly, although the inner shield 70 and mounting hub are described as being formed of two elements that are then connected, the inner shield and mounting hub may be formed as a unitary elements that is then connected with the pulley 35. Additionally, although the pulley assembly has been illustrated as including a pair of shield, in some applications it may be desirable or necessary to use a single shield, such as the outer shield 50. It should therefore be understood that this invention is not limited to the particular embodiments described herein, but is intended to include all changes and modifications that are within the scope and spirit of the invention as set forth in the claims.

The invention claimed is:

1. A tensioner assembly for providing tension to a belt, comprising:
    a tensioner comprising a biasing element for providing a biasing force;
    an arm connected to the tensioner, such that the biasing force of the biasing element is transmitted to the arm;
    a pulley assembly rotationally connected with the arm, wherein the pulley assembly is configured to rotationally engage the belt, comprising:
        a pulley configured to engage the belt, having a bore with an inner opening and an outer opening, wherein the inner opening opposes the arm;
        a bearing having an outer race connected with the inner bore of the pulley and an inner race;
        an outer cap enclosing the outer opening of the bore of the pulley to seal the outer opening to impede migration of contaminants through the outer opening;
        an inner shield for impeding migration of contaminants through the inner opening of the pulley bore, wherein the inner shield comprises a flange extending radially outwardly to overlap the inner opening of the bore, wherein the inner shield comprises a hub extending into the bore and the inner race of the bearing engages the hub;
    a connector for connecting the pulley assembly to the arm such that the pulley assembly is rotatable relative to the arm.

2. The tensioner assembly of claim 1 wherein the hub extends through substantially the entire thickness of the bearing.

3. The tensioner assembly of claim 1 wherein the inner shield is fixedly connected with the bearing such that the distance between the bearing and an inner edge of the inner shield is substantially constant.

4. The tensioner assembly of claim 3 wherein the inner shield is connected with a cylindrical insert having a first portion having a first diameter and a second portion having a second diameter, wherein the first diameter is larger than the second diameter, and wherein the first portion projects into the bearing, forming an interference fit with the bearing.

5. The tensioner assembly of claim 1 wherein the inner shield is configured such that a gap is formed between an inner edge of the shield and an inner face of the pulley to allow the pulley to rotate relative to the inner shield.

6. The tensioner assembly of claim 1 wherein the outer shield encloses an outer end of the connector.

7. The tensioner assembly of claim 1 wherein the pulley assembly comprises a bearing retainer overlying a portion of the outer opening of the pulley and the outer shield is connected with the bearing retainer.

8. The tensioner assembly of claim 1 wherein the outer shield is releasably connected with the pulley.

9. The tensioner assembly of claim 1 wherein the flange of the inner shield extends radially outwardly to overlap the entire inner opening of the bore.

10. The tensioner assembly of claim 1 wherein the flange of the inner shield extends radially outwardly to overlap the entire inner opening of the bore.

11. A tensioner assembly for providing tension to a belt, comprising:
    a tensioner comprising a biasing element for providing a biasing force;
    an arm connected to the tensioner, such that the biasing force of the biasing element is transmitted to the arm;
    a pulley assembly rotationally connected with the arm, wherein the pulley assembly is configured to rotationally engage the belt, comprising:
        a pulley configured to engage a belt, having a bore with an inner opening and an outer opening, wherein the inner opening opposes the arm;
        a bearing having an outer race connected with the inner bore of the pulley and an inner race having a width;
        an outer cap enclosing the outer opening of the bore of the pulley to seal the outer opening to impede migration of contaminants through the outer opening;
        an inner shield for impeding migration of contaminants through the inner opening of the pulley bore, wherein the inner shield comprises a flange extending radially outwardly to overlap the inner opening of the bore, and wherein the inner shield is fixedly connected with a hub that projects into the bearing, extending through substantially the width of the inner race;
    a connector for connecting the pulley assembly to the arm such that the pulley assembly is rotatable relative to the arm.

* * * * *